3,320,921
BRAKE LINING WEAR INDICATOR
Gilbert H. Wolf, Milford, and Marvin W. Weathers, Warren, Mich., assignors to General Motors Corporation, Detroit, Mich., a corporation of Delaware
Filed Sept. 22, 1966, Ser. No. 581,333
6 Claims. (Cl. 116—67)

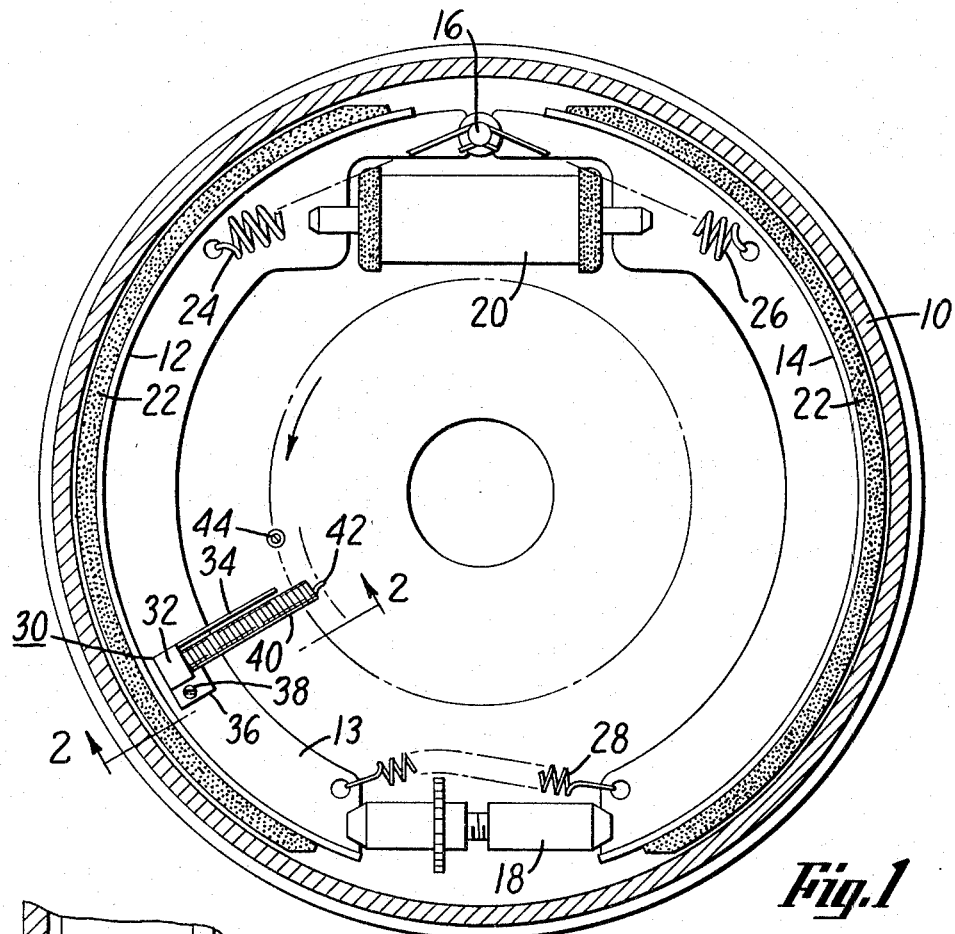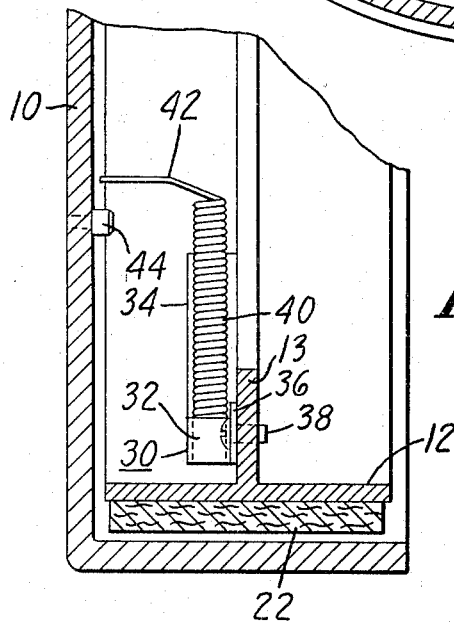

This invention relates to a mechanism providing a warning signal to the vehicle operator when the brake lining has worn a predetermined degree and more specifically concerns a mechanical wear indicating device that provides an audible signal.

Many devices have been developed in the past to provide some sort of signal to a vehicle operator informing him that brake lining wear has progressed a predetermined degree. However, these devices usually involve relatively complex structures that necessarily require several machining operations to manufacture and effect installation. The purpose of this invention is to provide a reliable device which will provide an audible signal to the vehicle operator, which requires minimum machining of a conventional wheel drum assembly, and incorporates a minimum number of parts, thereby rendering such device feasible to utilization with all four wheels of an automobile. In fact, the subject invention includes structure that can be easily added to vehicles currently being used with a minimum of effort and, therefore, provides an advantage over devices known heretofore.

Accordingly, among the objects of this invention is the provision of a mechanical signal device which can be attached to a conventional brake shoe.

Another object of this invention is to provide a simply constructed device which reliably provides an audible signal when the brake lining is worn a predetermined degree.

A further object of this invention is the provision of a mechanism which produces an audible signal and is capable of being secured within a conventional wheel drum assembly without interference of the operating parts therein.

Yet another object of this invention is the provision of a brake lining wear indicator having good wear characteristics comprising a minimum number of moving parts.

In the drawings:

FIGURE 1 is an elevation view illustrating a wheel brake assembly with parts in section so that the brake lining wear indicating device is visible.

FIGURE 2 is a view taken on lines 2—2 of FIGURE 1, with parts broken away and in sections.

Referring now to FIGURE 1, the brake assembly includes a brake drum 10 and conventional brake shoes 12 and 14 engaging an anchor pin 16 at their upper ends. A conventional lining wear adjustment mechanism 18 connects the lower ends of the shoes 12 and 14 and a wheel cylinder 20 is provided to actuate the shoes into engagement with the drum 10 when it is desired to retard movement of the vehicle. The shoes 12 and 14 have linings 22 secured thereto and are biased to a retracted position by springs 24 and 26, while a spring 28 is provided to maintain the lower ends of shoes 12 and 14 into engagement with adjustment mechanism 18.

The brake wear indicating device comprises a bracket 30 which has an arcuate portion 32 and a clapper or radially extending member 34 integral therewith. A base portion 36 of the bracket 30 is secured to the brake shoe web 13 by a suitable means such as screw 38, as more clearly shown in FIGURE 2. A coil spring 40 is frictionally seated within the arcuate portion 32 of bracket 30 and extends radially inwardly adjacent clapper member 34 and is provided with a laterally extending end finger 42. The drum member 10 has a cam member 44 secured thereto as best shown in FIGURE 2.

In operation, the brake lining wear indicator assembly 30 is positioned at a suitable point on one of the brake shoes 12 or 14 so that finger 42 is specifically positioned with regard to the brake linings 22 and the cam member 44 is also disposed in a specific position relative to either the finger 42 of spring 40 or with respect to the brake linings 22 such that the cam rotates in the path indicated by the arrows in FIGURE 1. When the brakes are applied, the shoes and therefore finger 42 have a component of radially outward movement so that finger 42 aproaches the path of cam member 44. When the linings have worn a sufficient degree and the brakes are applied, cam member 44 will engage finger 42 of the spring 40 during each drum revolution that the brakes are applied, causing the spring to be bent away from the clapper member 34. When the cam member 44 has moved a sufficient arcuate distance, the spring will be released to strike the clapper 34 and provide a desired signal audible to the operator. As the linings continue to wear and further adjustment of the brake shoes occurs, particularly in brake assemblies with automatic adjusters, the shoes may be adjusted outwardly a distance sufficient that finger 42 is engaged by the cam member 44 at all times when the drum 10 is rotating. Thus the signal would then be a constant reminder of the urgency for immediate relining of the brakes. It should also be noted that the wheel nuts or lugs as used to conventionally attach the drum to the wheel could also be used to engage and actuate the spring member 42.

From the above description, it should be obvious that the indicating mechanism can be attached in many ways to the brake shoes and that different suitable cam members or lugs would be effective to engage the spring finger and provide movement of the spring necessary to produce an audible signal. It is also evident that the spring can be a resilient member of various forms and that the disclosure of coil spring and a clapper member integral with the fastening bracket are used for purposes of illustration only. For these reasons, the above disclosure is intended for purposes of describing the preferred embodiment of the invention and does not in any way limit the scope of this invention.

We claim:

1. A brake lining wear indicating device comprising a clapper plate secured to a brake shoe disposed within a wheel brake drum, a spring member having a free end and having the other end secured to the brake shoe adjacent said clapper plate, cam means secured to the wheel drum in a predetermined position relative to the free end of said spring member, a predetermined amount of brake shoe lining wear causing said cam to intermittently engage and release the free end of said spring member as the drum rotates whereby the spring member strikes said clapper member and produces an audible signal.

2. A brake lining wear indicating device as described in claim 1 wherein said clapper plate and said spring member are secured to the web of the brake shoe.

3. A brake lining wear indicating device as described in claim 1 wherein said spring member comprises a coil spring having a laterally bent finger that is engaged by said cam means.

4. A brake lining wear indicating device as described in claim 1 including means for attaching said spring member to said brake shoe, said means comprising a bracket member having a cylindrical portion which frictionally receives one end of said spring member and has an integrally extending portion comprising said clapper member.

5. A brake lining wear indicating device as described in claim 1 wherein said spring member and its free end are moved radially outwardly during application of the brakes whereby the spring free end will only be engaged by said cam member while the brakes are applied and sufficient brake lining wear has occurred.

6. A brake lining wear indicating device as described in claim 1 wherein said spring member and its free end are positioned relative to said cam member whereby a predetermined amount of brake lining wear and brake shoe adjustment to compensate therefor causes said spring free end to be engaged by said cam member while the brakes are not applied and the brake drum is rotating.

No references cited.

LOUIS J. CAPOZI, *Primary Examiner.*